United States Patent
Aziz et al.

(10) Patent No.: US 6,643,701 B1
(45) Date of Patent: Nov. 4, 2003

(54) METHOD AND APPARATUS FOR PROVIDING SECURE COMMUNICATION WITH A RELAY IN A NETWORK

(75) Inventors: Ashar Aziz, Freemont, CA (US); Geoffrey Baehr, Menlo Park, CA (US); Germano Caronni, Sunnyvale, CA (US); Amit Gupta, Fremont, CA (US); Vipul Gupta, Fremont, CA (US); Glenn C. Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/441,451

(22) Filed: Nov. 17, 1999

(51) Int. Cl.[7] .............................................. G06F 15/16
(52) U.S. Cl. ..................... 709/227; 709/203; 709/217; 709/219; 709/228; 713/150; 713/155; 713/201; 705/64; 705/65
(58) Field of Search ................................ 709/200–203, 709/217–219, 227–229; 713/150–151, 155–156, 200–202; 705/64–67

(56) References Cited

U.S. PATENT DOCUMENTS

| | | | |
|---|---|---|---|
| 5,778,174 A | * | 7/1998 | Cain ........................... 713/201 |
| 5,805,803 A | * | 9/1998 | Birrell et al. ................ 709/228 |
| 5,848,161 A | * | 12/1998 | Luneau et al. ............... 713/151 |
| 5,915,087 A | * | 6/1999 | Hammond et al. ......... 713/201 |
| 6,081,900 A | * | 6/2000 | Subramaniam et al. ..... 713/201 |
| 6,275,941 B1 | * | 8/2001 | Saito et al. .................. 713/201 |

FOREIGN PATENT DOCUMENTS

| | | | |
|---|---|---|---|
| WO | WO 98/05011 | 2/1998 | ........... G06F/19/00 |
| WO | WO 98/38776 | 9/1998 | ........... H04L/29/06 |

* cited by examiner

Primary Examiner—Bharat Barot
(74) Attorney, Agent, or Firm—Finnegan, Henderson, Farabow, Garrett & Dunner LLP

(57) ABSTRACT

Methods and systems of the present invention include providing a connection between a first computer and a second computer by receiving, at a third computer, information regarding one of the first and second computers to facilitate establishment of a secure connection between the first computer and the second computer, creating a first end-to-end security link between the first computer and third computer, and creating a second end-to-end security link between the second computer and the third computer to establish the secure connection. The first and second computers could be a client and a server on the Internet, and these methods and systems can, for example, increase the possible number of new secure connections to the server. The third computer also permits processing of information transmitted between the client and server in the third computer. For example, the information could be reformatted or used in testing a process of one of the first and second computers.

26 Claims, 10 Drawing Sheets

METHOD AND APPARATUS FOR PROVIDING SECURE COMMUNICATION WITH A RELAY IN A NETWORK

BACKGROUND OF THE INVENTION

A. Field of the Invention

The present invention relates generally to data processing systems and, more particularly, to providing secure communication between a client and a server.

B. Description of the Related Art

The Internet is a collection of computers sending messages to one another over a network that delivers the messages. There are, however, fraudulent computers on the Internet that attempt to trick the network into delivering messages intended for another to them or instruct the network to send bogus messages. In addition, information on the network could be viewed as it is being delivered. Therefore, there is a need to authenticate that the sender or recipient of the message is a proper sender or recipient and to encrypt the message to prevent unauthorized viewing.

When starting a secure communication session, the sender asks a recipient to begin a communication session, and the recipient replies with information that the sender can use to verify that the recipient is not fraudulent. In some cases, the sender could also provide information that the recipient can use to verify that the sender is not fraudulent.

After confirmation of the identity of the recipient and possibly the sender, the sender and the recipient negotiate a set of "keys" with which to use to encrypt and decrypt messages sent between them.

When encrypting a message, the sender uses an encryption key and an encryption algorithm to encrypt messages so that those without the appropriate key cannot read the messages. Upon receiving an encrypted message, the recipient decrypts messages using the appropriate key to render the messages readable (which is also known as "cleartext").

Various publicly available systems permit the authentication, encryption, and decryption of messages from one end to another end on the Internet. Most web-based applications, such as on-line banking, electronic shopping, and secure remote access to protected networks (like Intranets), use an end-to-end security protocol, such as the Secure Session Layer (SSL) protocol or Transport Layer Security (TLS) protocol for their security needs. Some end-to-end security protocols, such as SSL and TLS, use public-key cryptography to generate symmetric keys (which are also known as session keys) that are used by the encryption and authentication algorithms. The sender and receiver negotiate the symmetric keys during a "handshake" protocol, which typically includes the following steps: (1) authentication, and (2) key exchange using a Rivest, Shamir, and Adelman (RSA) or a Diffie-Hellman (DH) algorithm.

FIG. 1 illustrates a high level diagram of how clients 100 would communicate with a server 120 over a network, such as the Internet, in a manner consistent with the prior systems. The term "client" is typically associated with a program that sends a request for information from the "server." Nevertheless, these terms are used as examples to differentiate the end points in a network, and "client" could mean "server" and vice versa.

Clients 100 attempt to negotiate how information should be securely transmitted. This negotiation is referred to as a handshaking session. For example, a client 100 desiring to initiate a link 110 using SSL (because of the relatedness between SSL and TLS, in the following discussions "SSL" should be regarded as "SSL or TLS") and RSA key exchanges would extend its "hand" by informing server 120 it wishes to communicate using SSL and provide information about the client. Server 120 would extend its "hand" with a reply containing information about server 120 and a certificate used in authenticating the server. In some applications, the server may wish to authenticate client 100, for example if a user of client 100 is accessing a bank account. If so, server 120 would ask for the certificate of client 100. Another method of authenticating the client would be to provide an application-specific authentication at a level above the SSL layer. For example, the user could supply an authentication token, such as a password, known to the server. Client 100 then authenticates server 120 using the certificate and other information, suchan Internet address. If server 120 cannot be authenticated, the user of client 100 is warned of the problem and informed that an encrypted and authenticated connection cannot be established. Otherwise, client 100 generates a premaster secret, encrypts it with a public key of server 120, which is a part of the certificate of server 120, and sends the encrypted result to server 120. The premaster secret is a secret message that is used to derive a master secret by including additional information such as random numbers selected by the client and server. When an RSA key exchange mechanism is used, client 100 selects the premaster secret without any input from server 120. By including an additional hashing step in the derivation of the master secret from the premaster secret, server 120 can supply input in the master secret derivation. When client authentication is requested, client 100 uses a private key of client 100 to sign any piece of data that is unique to this handshake and known by both the client and server, and sends the signed data, the certificate of client 100, and the encrypted premaster secret to server 120. Server 120 then attempts to authenticate client 100.

If all authentications are successful, server 120 generates the premaster secret from the encrypted result sent from client 100. For example, using RSA, the server decrypts the encrypted result from client 100 to generate the premaster secret. In a DH key exchange, server 120 computes the premaster secret using a public key exponentiation. Then, client 100 and server 120 use the premaster secret to generate a master secret, which is used to generate the session keys, which are symmetric keys used to encrypt and decrypt information exchanged during the SSL session and to detect any changes in the data between the time it was sent and the time it is received over the SSL connection.

Client 100 sends a message to server 120 informing it that future messages from the client will be encrypted with the session key and an encrypted message indicating that the client portion of the handshake is finished. Server 120 responds with a message to client 100 informing it that future messages from the server will be encrypted with the session key and an encrypted message indicating that the server portion of the handshake is finished.

Thereby, the SSL handshake session is completed and an SSL link 110, over which client 100 and server 120 transfer data, is established. For subsequent communications between client 100 and server 120, a session resumption procedure is initiated. In this case, client 100 simply identifies itself to server 120 and indicates that it will continue to use the agreed upon keys from the previous handshaking session stored in memory in client 100. Server 120 would acknowledge that the end-to-end security session should be resumed over link 110 and use the keys stored in memory in the server 120.

These publicly available systems, however, could be improved.

The number of new secure connections a hyper text transfer protocol secure (HTTPS) server can handle is typically a small fraction of the number of new regular connections (HTTP) it can handle because the computation steps in the handshaking session are computationally intense and burdensome. If another client 100 requests a new secure connection, it must be refused until the server is able to process the request.

Also, the encrypted connection can make troubleshooting problematic. It may be difficult for application users to test their programs and thereby diagnose and understand performance problems, especially when the user cannot monitor performance at end-points (typically browsers or HTTPS servers) either because of lack of access to source code and/or the difficulty of putting in the appropriate instrumentation mechanisms there.

Additionally, the prior systems could send inappropriate information because a user receiving a message from a server may not require all of the information sent or the message may be an undesirable format.

SUMMARY OF THE INVENTION

Systems and methods consistent with the present invention can provide a greater number of secure connections between a first computer and a second computer in a given time than was typically possible in the prior art. Also, the systems and methods can place mechanisms to process data in locations within the system that were previously unavailable. Thereby, a secure system could test or reformat the information sent between the first and second computers so that only appropriate information is received.

In accordance with methods consistent with the present invention, a method is provided. This method provides a connection between a first computer and a second computer by receiving, at a third computer, information regarding one of the first and second computers to facilitate establishment of a secure connection between the first computer and the second computer, creating a first end-to-end security link between the first computer and third computer, and creating a second end-to-end security link between the second computer and the third computer to establish the secure connection.

In accordance with systems consistent With the present invention, a system is provided. This system provides a connection between a first computer and a second computer and includes a third computer that receives information regarding one of the first and second computers to facilitate establishment of a secure connection between the first computer and the second computer, a first end-to-end security link between the first computer and third computer, and a second end-to-end security link between the second computer and the third computer to establish the secure connection.

In accordance with devices consistent with the present invention, a computer medium is provided. This computer medium contains instructions for controlling a computer network to perform a method for providing a connection between a first computer and a second computer, the method including receiving, at a third computer, information regarding one of the first and second computers to facilitate establishment of a secure connection between the first computer and the second computer, creating a first end-to-end security link between the first computer and third computer, and creating a second end-to-end security link between the second computer and the third computer to establish the secure connection.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the implementations of the invention and together with the description, serve to explain the principles of the invention.

DETAILED DESCRIPTION OF THE INVENTION

Reference will now be made in detail to the construction and operation of an implementation of the present invention which is illustrated in the accompanying drawings. The present invention is not limited to this implementation but it may be realized by other implementations.

A. Overview

Methods and systems consistent with the present invention include a number of improved network architectures to avoid the problems encountered by some conventional systems when providing secure communication between a client and a server. In these architectures, an intermediary computer ("a relay") through which all communications flow is disposed between the client and the server. This relay provided in the improved architectures provides the ability to connect more clients to a server, in a given time, and can also be used to decrypt, test, or reformat the information sent between the client and server so that only appropriate information is received. Because the relay is trusted by at least one of the client and server, security is maintained, and a secure connection is provided between the client and the server.

B. Architecture

Figure 2:
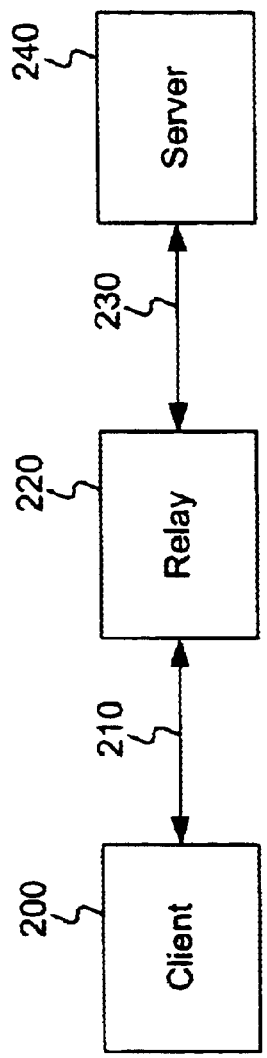
FIG. 2 illustrates a high level diagram of a network consistent with the present invention.

FIG. 2 illustrates a high-level view of an improved network architecture of the present invention that allows secure transmission of information from a client 200 to a server 240. In FIG. 2, a first end-to-end secure transmission link 210 is provided between a client 200 and a relay 220, and a second end-to-end secure transmission 230 link is provided between relay 220 and a server 240.

Information stored on relay 220 is used to create the secure connection. When a server wishes to obtain advantages of the present invention in a manner that could be transparent to client 200, server 240 will have a trust relationship with (that is, be controlled by or even be owned by the same entity as) relay 220. Therefore, server 240 will share its private key and certificate with relay 220. When a client wishes to obtain advantages of the present invention in a manner that could be transparent to server 240, client 200 will have a trust relationship with relay 220, and client 200 will, e.g., accept the certificate of relay 220 as that of server 240 and provide an authentication token of client 200 to relay 220. Thereby, relay 220 may be inserted without access to the server's keys. This architecture could, for example, assist a programmer in diagnosing problems with a client's application that communicates with an HTTPS server (by convention a secure server address is given the prefix "https://") even when the server would not provide the programmer with access to the server's keys. When both client 200 and server 240 wish to achieve the advantages of the present invention in a manner known to each entity, each will provide appropriate information to relay 220.

Figure 3:
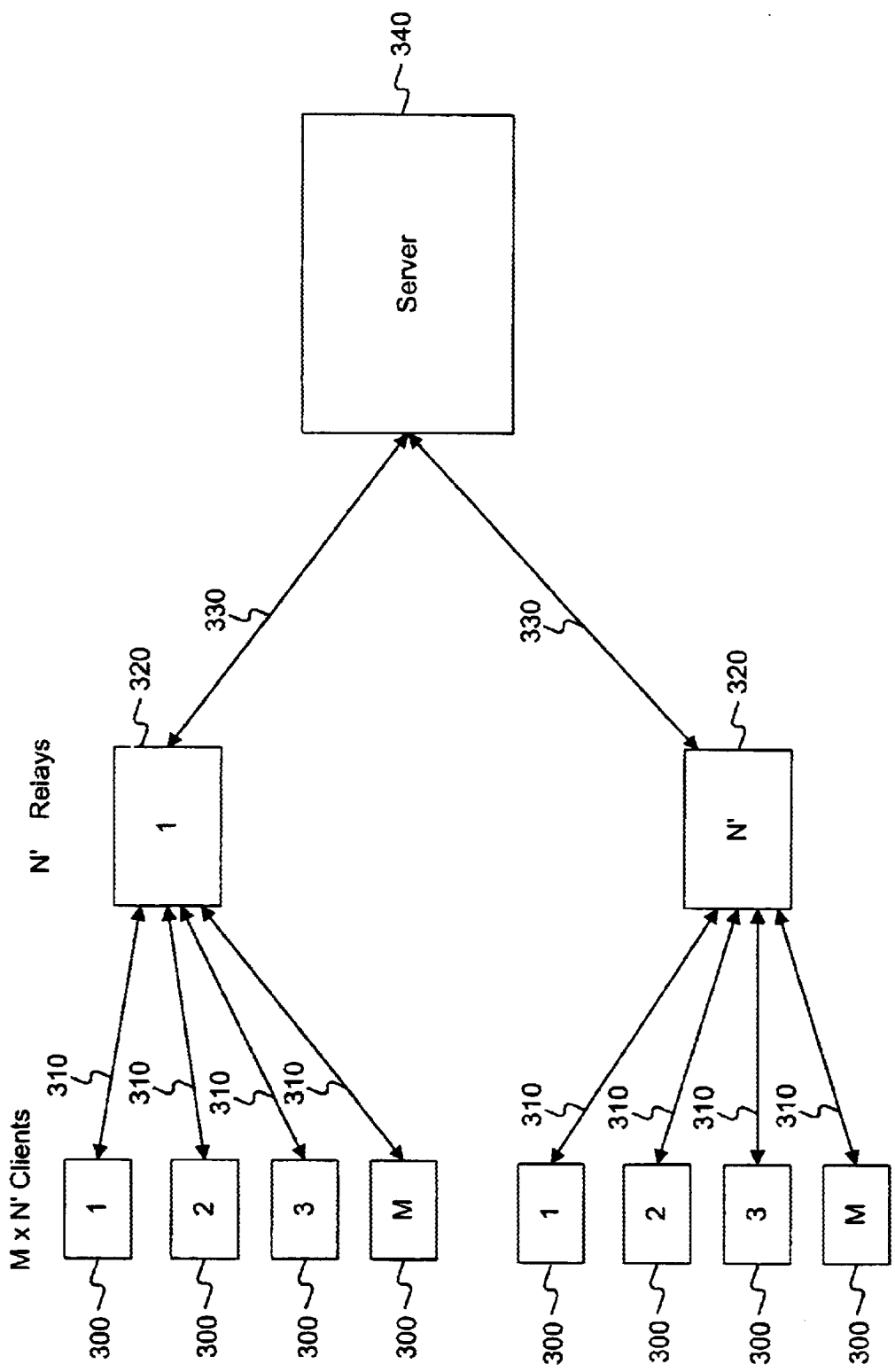
FIG. 3 illustrates a first more detailed diagram of a network consistent with the present invention.
Figure 4:
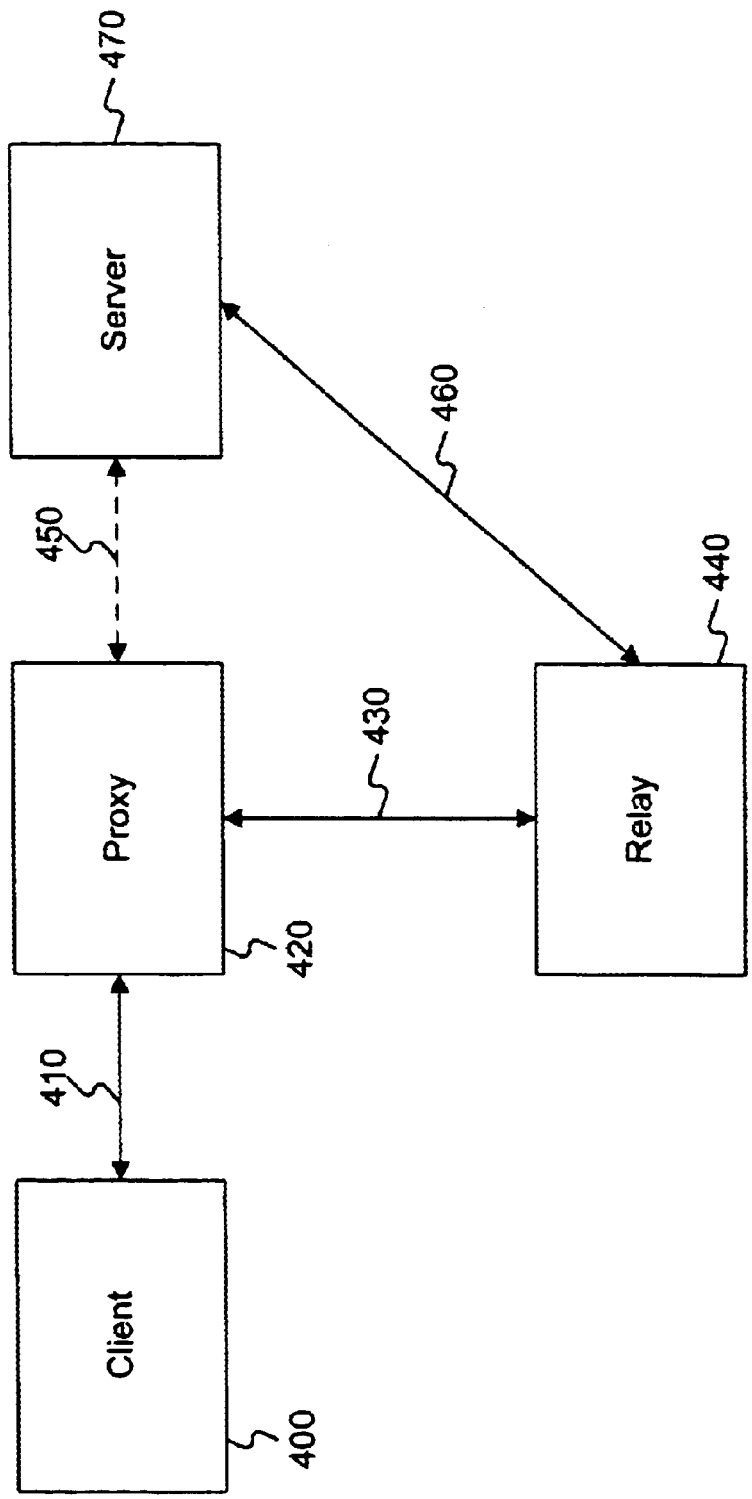
FIG. 4 illustrates a second more detailed diagram of a network consistent with the present invention.

FIGS. 3 and 4 illustrate more detailed network architectures of the present invention. The architecture of FIG. 3 is an example of an architecture particularly suited for the aspect of the present invention when the server wishes to achieve the advantages of the present invention. The architecture of FIG. 4 is an example of an architecture suited for when either the server or the client wish to achieve the advantages of the present invention. Nevertheless the description of FIG. 4 is an example of aspects of the present invention when the client wishes to achieve the advantages of the present invention.

In FIG. 3, a server 340 provides intermediate relays 320 with information that can authenticate the relays as server 340. Each client 300 negotiates an end-to-end secure transmission link 310 with a particular relay 320. Each relay is connected to a server through another end-to-end secure transmission link 330 to server 340. This structure allows secure transmission of information from the client 300 to server 340.

If the network between relays 320 and server 340 is trusted (as would be the case if the relays, network, and server were all in the same facility) and therefore secure, connection 330 could even be cleartext HTTP connection, reducing the server workload even more compared to using previously negotiated SSL sessions, as will be discussed below.

FIG. 4 is a diagram of a network architecture consistent with the present invention when a client 400 instructs an HTTPS proxy 420 (which is also known as a secure proxy) to send a client request for a secure connection with server 470 to relay 440 a server 470 and provides relay 440 information that can authenticate relay 440 as client 400. Client 400 provides a request to access server 470 along a connection 410 to proxy 420.

Once connected to relay 440, client 400 negotiates an end-to-end secure transmission link with relay 440 through proxy 420, link 410, and a new link 430. Relay 440 is connected to server 470 through another end-to-end transmission link 460. Instead of providing a connection 450 between proxy 420 and server 470, this structure allows secure transmission of information between client 400 and server 470 through link 410, proxy 420, link 430, relay 440, and link 470.

Although FIG. 4 illustrates a single client, proxy, and relay, any number of clients could send information to relay 440 and more than one relay could be provided to expand the number of connections, as was described analogously in conjunction with FIG. 3.

Figure 5:
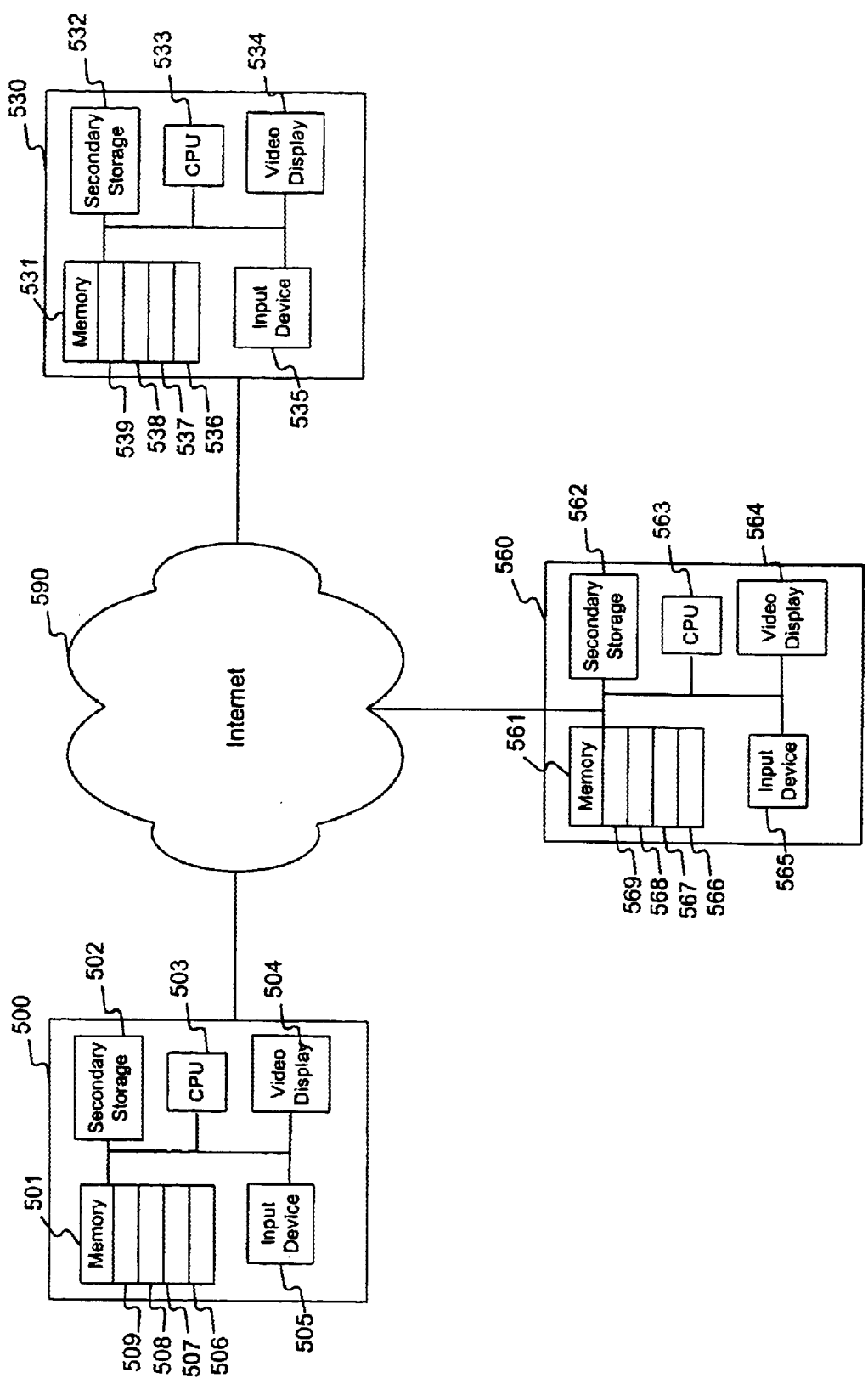
FIG. 5 illustrates further details of a network in accordance with methods and systems consistent with the present invention.

A client, server, or relay in FIGS. 2–4 could be collection of machines, a separate machine, or a portion of a machine, such as a daemon. For example, as illustrated in FIG. 5, clients 200, 300, and 400 could each be a client computer 500, server computers 240, 340, and 470 could each be a server computer 530, and relay computers 220, 320, and 440 could each be relay computer 560.

Client 500, server 530, and relay 560 communicate via Internet 590. Each device contains similar components, including a memory 501, 531, 561; secondary storage 502, 532, and 562; a central processing unit (CPU) 503, 533, and 563; a video display 504, 534, and 564, and an input device 505, 535, and 565. One skilled in the art will appreciate that these devices may contain additional or different components. Memory 501 of client 500 includes an operating system 506, a TCP/IP protocol stack 507, a program to create a secure connection 508, and a client application program 509. Memory 531 of server 530 includes an operating system 536, a TCP/IP protocol stack 537, a program to create a secure connection 538, and a server application program 539. Memory 561 of client 560 includes an operating system 566, a TCP/IP protocol stack 567, a program to create a secure connection 568, and a data processing program 569.

C. Architectural Operation

The networks shown in FIGS. 2–4 provide clients and servers the ability to enhance operation of the network. For example, as explained with reference to FIG. 3 (although the same concept applies to FIG. 4), server 340 can typically process a certain number (N) of end-to-end security handshakes at a given time, similarly to server 110 in FIG. 1. Server 340, however, can process N' (N'>N) session resumption requests based on information from a previously stored handshake session.

Because intermediate relays 320 could be substantially dedicated to processing the secure connections 310 and 330 and relaying information between client 300 and server 340, relays 320 could handle more handshake sessions (M>N) than server 340. In other words, storage of the substantive content of server 340 is unnecessary on intermediate relays 320.

Figure 1:
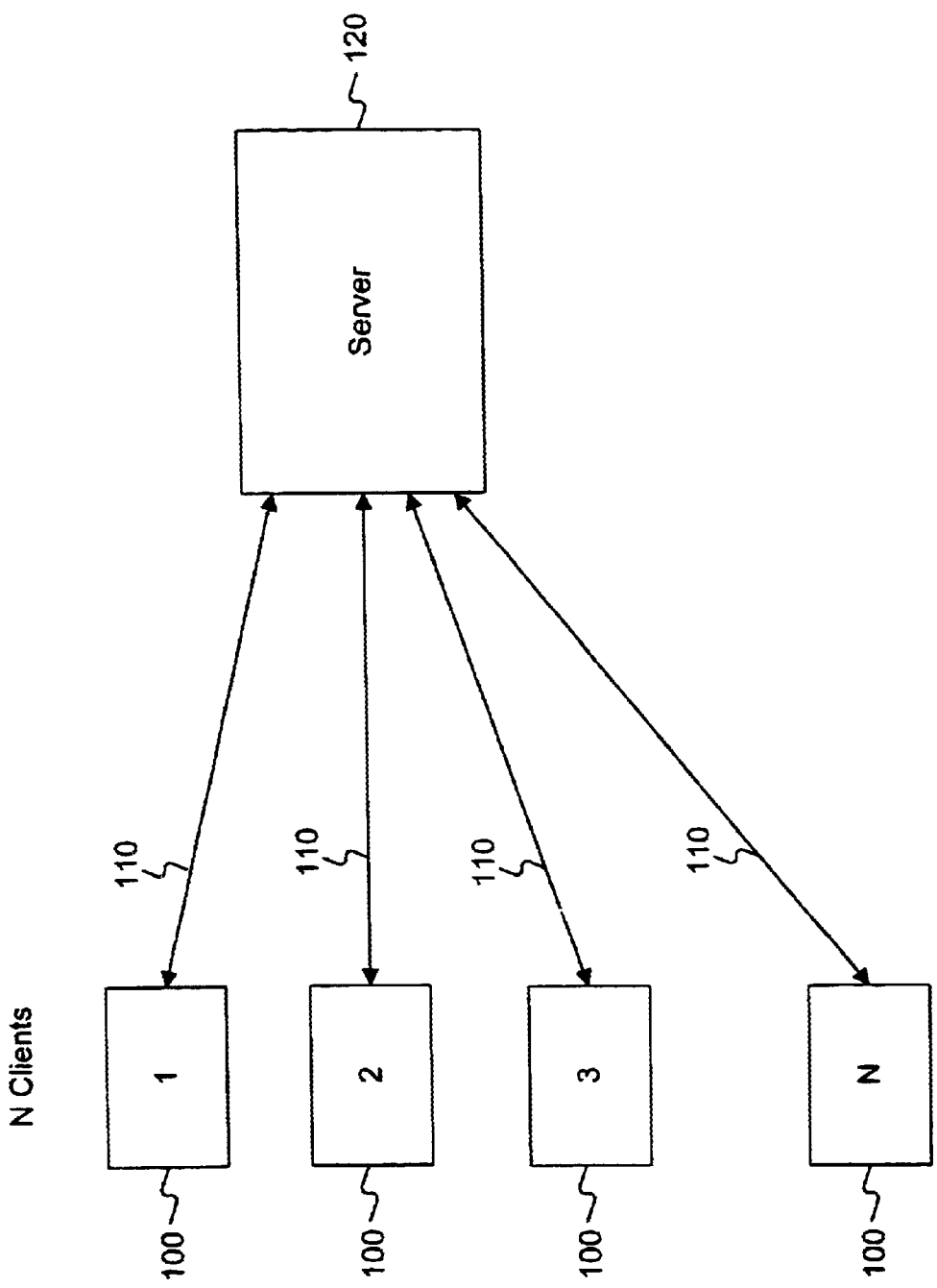
FIG. 1 illustrates a high level diagram of a conventional network.

With N' intermediate relays 320 between client 300 and server 340, server 340 can handle a larger number (M×N') of client-initiated handshake sessions than that typically provided in FIG. 1. Of course this larger number (M×N') is based on a situation where each client initiates a new handshaking session with a relay in a one-to-one relationship. In most cases, relay 320 will also handle handshake session resumption sessions with clients in addition to handling new handshake sessions and server 340 would initiate both new handshake sessions and resumption handshake sessions. In other words, the actual workload of the relay and the server will determine the number new handshake sessions that the network can handle at a given time.

Relays 220, 320, and 440 could also be used to provide new features to a client. All of the information sent from a client is decrypted by the relay. Also, all of the information sent from the server is decrypted by the relay. Accordingly, the relay possesses an understandable (cleartext) version of the entire communication between the client and the server. This information could be used to test malfunctioning equipment or processes. For example, relays 220, 320, and 440 could examine messages, perform timing measurements, alter the messages for failure analyses, or otherwise perform functions needed for problem diagnosis or troubleshooting, for example by logging all cleartext messages along with the times at which they were received.

Also, intermediate relays 220, 320, and 440 could be configured to provide a new service for a server without reconfiguring the server. For example, relays 220, 320, and 440 can reformat or otherwise transform content being sent to the client, e.g., by transcoding a color image as grayscale or stripping away images completely. In other words, if the client is a small device, like a PDA or a cell phone, with significant limitations on screen-size, or the ability to display color or graphics, content from the server specific to robust web-browsers and sophisticated computers can be reconfigured so that the small device can process the information. In the case of FIG. 4, server 470 would not even have to know that the service is being provided, i.e., the provision of the service would be completely transparent to server 470.

Figure 6:
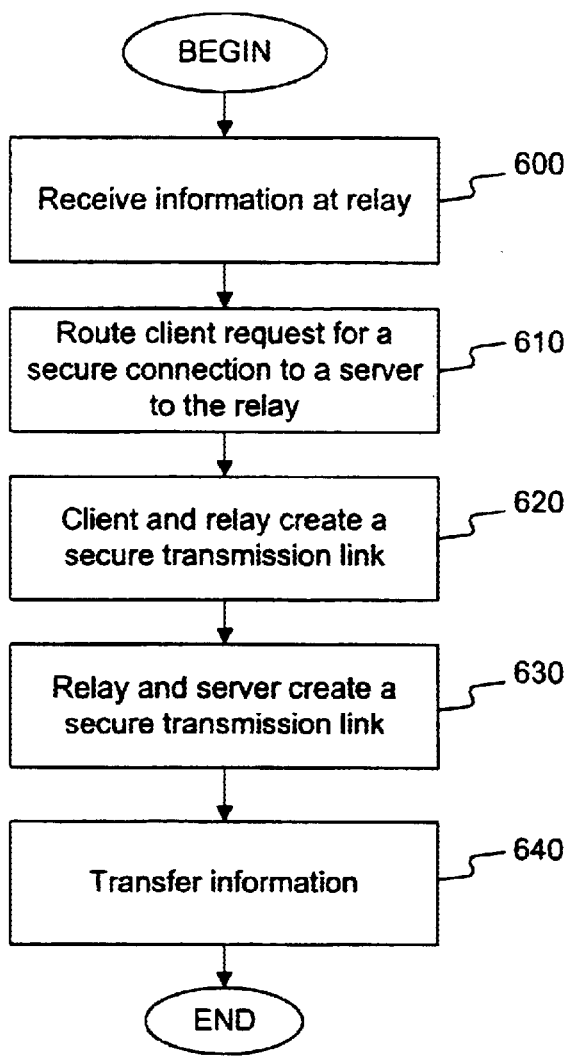
FIG. 6 is a flow chart of steps of the operation of the architecture of FIG. 2.

FIG. 6 illustrates the operation of the architecture shown in FIG. 2. Initially, relay 220 receives information regarding at least one of the client and the server for use in establishing at least one of the secure transmission links 210 and 230 (step 600).

Figure 7:
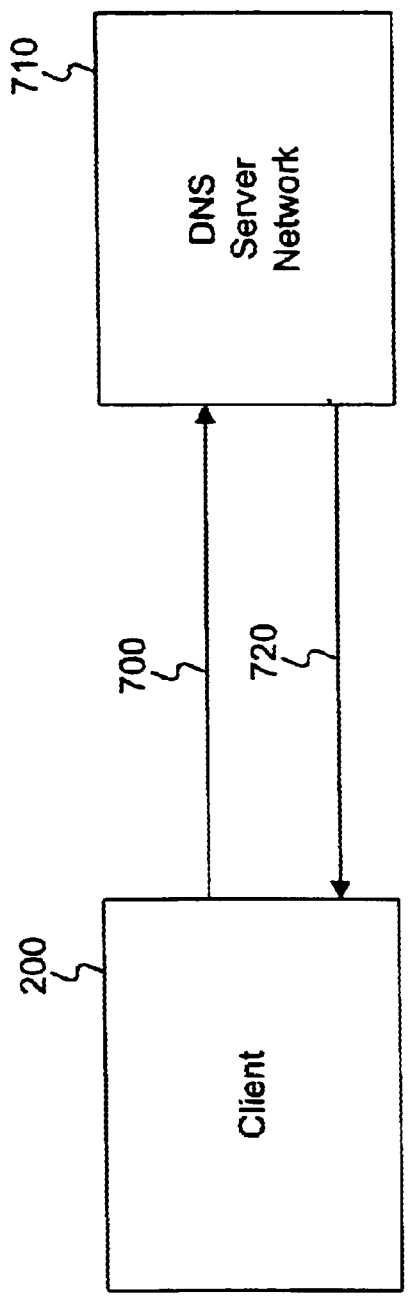
FIG. 7 illustrates a high level diagram of a system to reroute a request sent to the hostname of a server.
Figure 8:
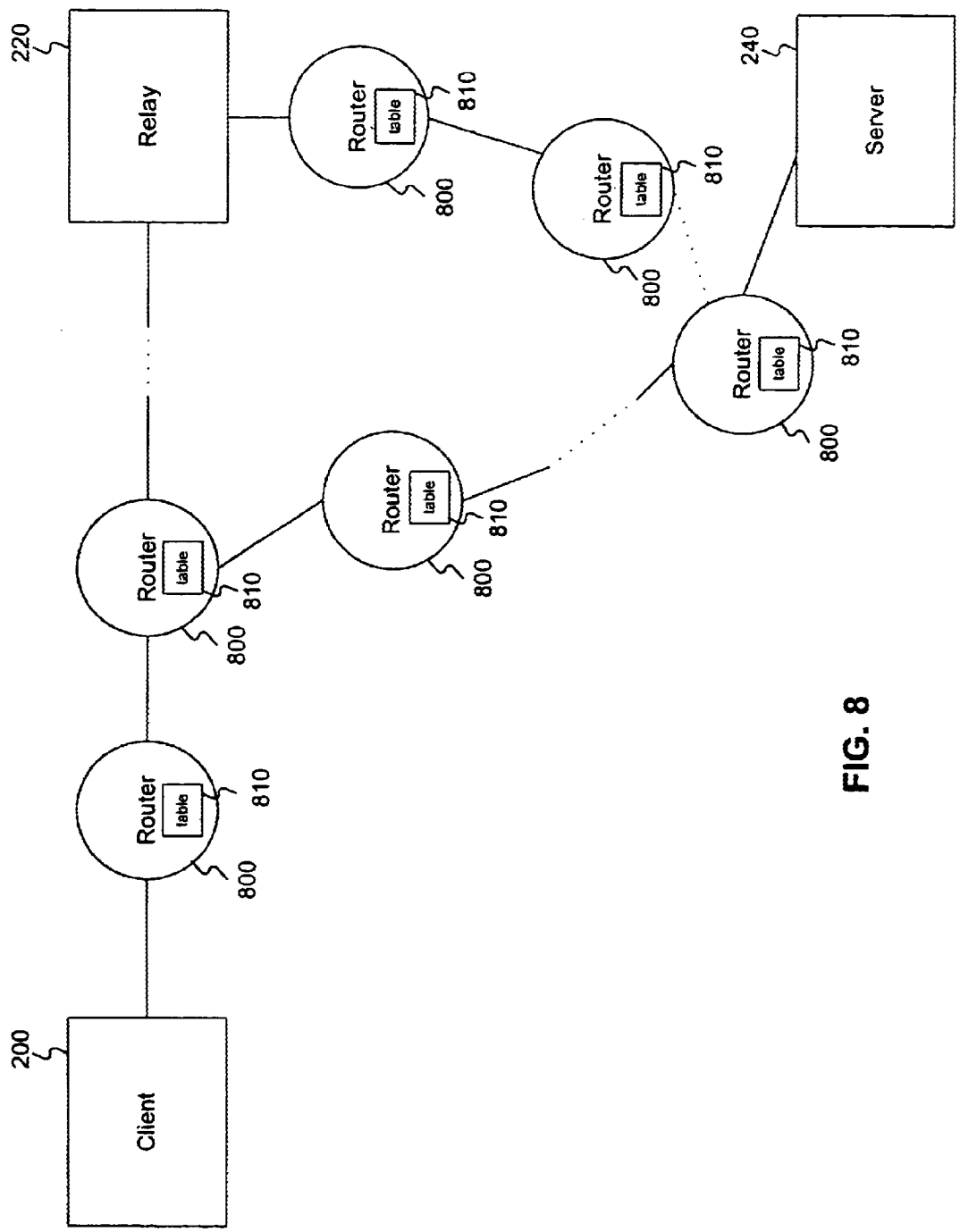
FIG. 8 illustrates another high level diagram of a system to reroute a request sent to the hostname of a server.

Then, a client's request for a secure connection to server 240 is routed to relay 220. There are several ways to reroute packets sent to a server's hostname to relay 220 and the present invention is consistent with any of the ways. For example, two of the ways are illustrated in FIGS. 7 and 8. Another way was shown in FIG. 4 and will be explained further in connection with FIG. 10.

In FIG. 7, server 240 would supply a public domain name server (DNS) network 710 with the numerical address of relays 220 instead of the server's real numerical address. Thus, in response to a client request including a numerical address query 710 for a text-based address for server 240 (https://www.bigbank.com), DNS 710 would return a reply 720 with a numerical address that corresponds to one of relays 220. Load balancing could also be used so that the DNS reply to the client sends the request to the most appropriate relay 220.

In FIG. 8, requests from client 200 for a connection to server 240 are routed through one or more routers 800. Each router 800 includes a table 810 that directs the request originating from client 200 to relay 220, instead of server 240. Thereby, traffic directed to server 240 will be rerouted to relay 220. Because several routers in FIG. 8 would need to be reconfigured, implementation of this rerouting method would be complex.

Other methods of redirecting the user's request are available, such as receiving the request at the server and bouncing it to one of the relays 220, and using, for example, a network address translation (NAT) box located at server 240.

After the client's request is routed to relay 220, the secure connection program in relay 220 and the secure connection program in client 200 negotiate an end-to-end secure transmission link 210 using a handshaking session (step 620). Either prior to, during, or in response to a client request for information from server 240, the secure connection program of relay 220 and the secure connection program of server 240 create an end-to-end secure transmission link 230 using a handshaking session (step 630). During at least one of steps 620 and 630, the information received in step 610 is used.

Once links 210 and 230 are established, the secure connection program of client 200 and the secure connection program of server 240 transfer information between client 200 and server 240 through relay 220. The data processing program in relay 220 can then intercept the transferred information and reformat or test the information, in a manner consistent with advantages of the present invention (step 640).

Figure 9:
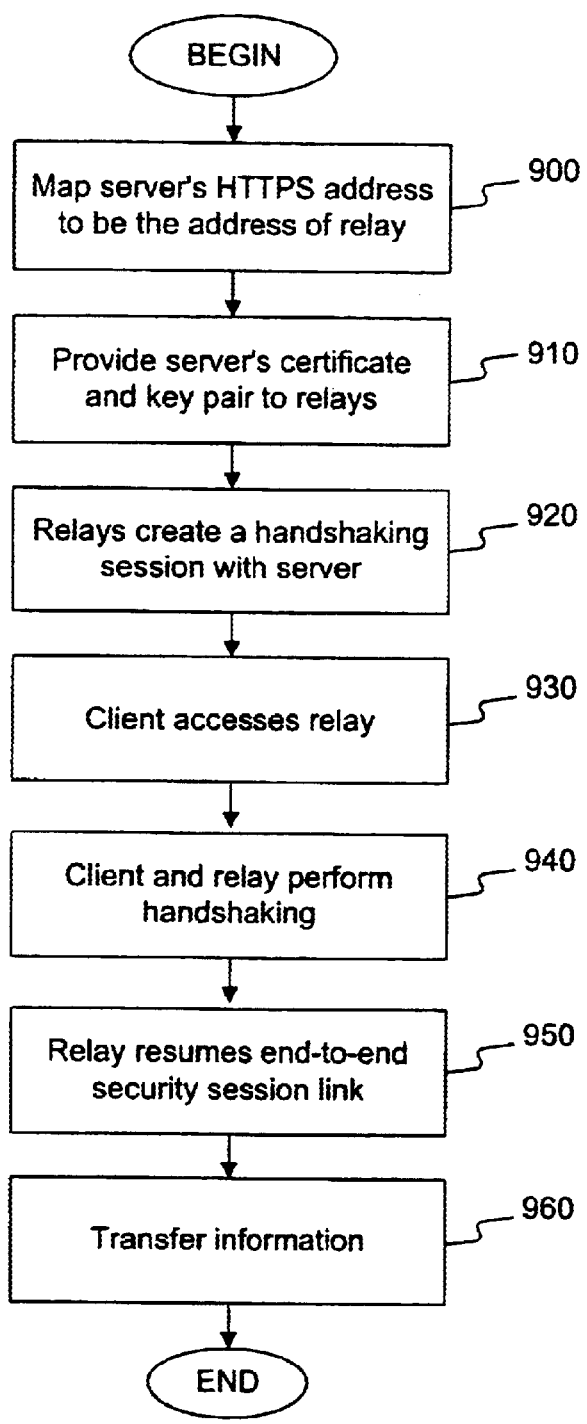
FIG. 9 is a flow chart of steps of the operation of the architecture of FIG. 3.

FIG. 9 illustrates a more detailed example of the present invention. FIG. 9 shows the operation of the architecture of FIG. 3 and the rerouting described in connection with FIG. 7. Initially, the network is set up so that a client request for access for a secure transaction to server 340 will be routed to one of relays 320 (step 900) using a public DNS server network.

Because relays 320 are trusted by server 340, server 340 provides each relay 320 with its security certificate and with its public and private key pair for use in an encryption/decryption process (step 910). Either prior to, during, or in response to a client request for information from server 340, the secure connection program of relay 320 and the secure connection program of server 340 create an end-to-end security link 330 using a handshaking session (step 920). For example, using SSL, this link is established following a handshaking session similar to that described with regard to FIG. 1. For enhanced security, each end point (relay and server) authenticates one another using the relay's certificate and private/public key pair and the server's certificate and private/public key pair. The secure connection program of relay 320 and the secure connection program of server 340 could also create link 330 following a refresh handshaking session that occurs after an initial handshaking session. The refresh handshaking session could occur at a predetermined period based on an elapse of a predetermined time, transfer of a predetermined amount of information, etc. to provide replacement session keys and, thus, increased security.

Upon receiving the client request at the relay (step 930), the secure connection program of client 300 and the secure connection program of relay 320 begin a handshaking session (step 940), for example in a similar manner to that described with regard to FIG. 1. Rather than using the relay's certificate and public/private key pair, the relay responds to the client's handshaking request using the server's certificate and public/private key pair. Thus, client 300 does not know that it is interacting with relay 320.

After the handshaking session is completed,the secure connection program of client 300 and the secure connection program of relay 320 create a link 310 between client 300 and relay 320. The secure connection program of client 300 initiates transfer of information from client 300 to the secure connection program of server 340 over link 310, through relay 320, and over link 330. Because link 330 may have been idle for sometime, link 330 may be broken in this case, the secure connection program of relay 320 and the secure connection program of server 340 must reestablish link 330 using a session resumption procedure (step 950). In this case, the secure connection program of relay 320 simply identifies itself to server 340 and indicates that it will continue to use the agreed upon keys from the previous handshaking session. Secure connection program of server 340 would acknowledge that the end-to-end security session should be resumed and create link 330. Once links 310 and 330 are established, the secure connection program of client 300 and the secure connection program of server 340 transfer information between client 300 and server 340 through relay 320. Then data processing program in relay 320 can then intercept the transferred information and reformat or test the information, in a manner consistent with advantages of the present invention (step 960).

Figure 10:
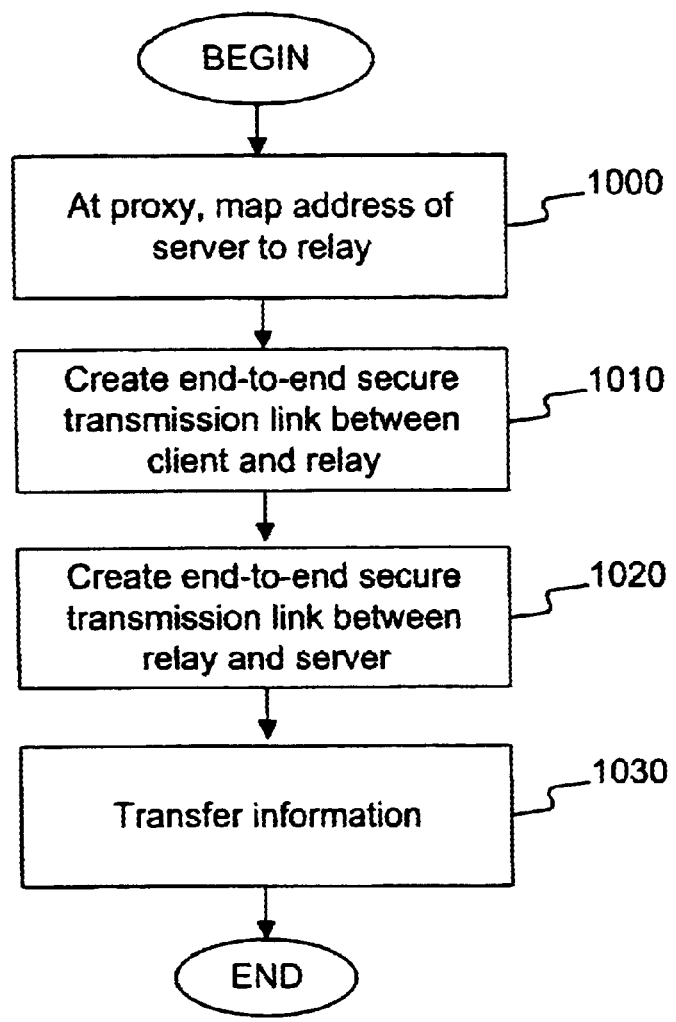
FIG. 10 is a flow chart of steps of the operation of the architecture of FIG. 4.

FIG. 10 illustrates the operation of the architecture shown in FIG. 4. Because client 400 trusts relay 440, client 400 requests proxy 420 to map a request for the HTTPS address of server 470 to the address of relay 440 (step 1000). Additionally, if server 470 requires authentication of client 400, client 400 will provide authentication tokens, such as passwords, certificates, and private keys to relay 440.

Client 400 sends a request to proxy 420 that it wishes to communicate securely with server 470. Instead of sending the request to server 470 through a link 450, the address map of proxy 420 directs the request to relay 440. The secure connection program of client 400 and the secure connection program of relay 440 create a secure transmission link from client 400 to relay 440 through link 410, proxy 420, and a new link 430 (step 1010) using, for example, a similar handshaking process as that described in FIG. 1. Because client 400 trusts relay 440, the client will authenticate relay 440 as if it is server 470 by accepting the certificate of relay 440 as valid instead of requiring server 470's certificate. Manifestation of this trust need only be performed once. For example, client 400 could store an instruction in a memory to accept the certificate of relay 440 as an authentic certificate of server 470 for use in subsequent communications.

The secure connection program of relay 440 and the secure connection program of server 470 create a secure link 460 between relay 440 and server 470 (step 1020). This link could be established prior, during, or in response to the client's request for communication. Nevertheless, because server 470 would not authenticate relay 440 as client 400, link 460 must be established subsequently to when a client 400 provides appropriate authentication tokens in the case that the secure connection program of server 470 seeks to authenticate client 400.

Once links 430 and 460 are established, the secure connection program of client 400 and the secure connection program of server 470 transfer information between client 400 and server 470 through proxy 420 and relay 440. Proxy 420 can act as a tunnel through which encrypted data sent between the client and relay flows. The data processing program in relay 440 can intercept the information transferred between client 400 and server 470 and reformat or test the information, in a manner consistent with advantages of the present invention (step 1060).

While the previous discussion of FIG. 10 presumed that client 400 is associated with proxy 420, proxy 420 could be associated with server 470. In this case, proxy 420 would redirect requests received from clients to relay 440 using the map stored in proxy 420. This redirection could be transparent to client 400.

It is important to recognize that securnty is still present in the networks shown in FIGS. 2–4. In each of the networks, at least one end trusts a relay to act on its behalf. Communications beyond the client, server, and trusted relay remain secure. In other words, using the systems and methods of the present invention, the present invention can easily upgrade the architecture of FIG. 1. Since the addition of relays minimally impacts a system, the present invention can increase the number of new secure connections to a server that can be established in a given time and provide new services in an efficient manner.

D. Conclusion

While there has been illustrated and described what are at present considered to be a preferred implementation and method of the present invention, it will be understood by those skilled in the art that various changes and modifications may be made, and equivalents may be substituted for elements thereof without departing from the true scope of the invention.

Modifications may be made to adapt a particular element, technique, or implementation to the teachings of the present invention without departing from the spirit of the invention.

Also, the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM.

Therefore, it is intended that this invention not be limited to the particular implementation and method disclosed herein, but that the invention include all implementations falling within the scope of the appended claims.

What is claimed is:

1. A method of providing a connection between a first computer and a second computer, comprising:

receiving, at a third computer, information regarding one of the first and second computers to facilitate establishment of a secure connection between the first computer and the second computer;

creating a first end-to-end security link between the first computer and third computer; and creating a second end-to-end security link between the second computer and the third computer to establish the secure connection.

2. The method according to claim 1, wherein the information regarding one of the first and second computers includes a certificate of the one of the computers and the creating the first end-to-end security link step uses the certificate to pass off the third computer as the one of the computers.

3. The method according to claim 1, wherein the end-to-end security links are one of Secure Socket Layer links and Transport Layer Security links.

4. The method according to claim 1, further comprising:

processing information transmitted between the first and second computers in the third computer.

5. The method according to claim 4, wherein the processing includes reformatting information received at the third computer from one of the first and second computers.

6. The method according to claim 4, wherein the processing includes testing a process of one of the first and second computers.

7. A method of processing data transmitted between a client and a server, comprising:

providing an authentication token of the client to a trusted relay computer;

receiving a request from the user for a connection between the client and the server;

transmitting the request to the trusted relay computer;

creating a first end-to-end security link between the client and the trusted relay computer;

providing the authentication token to the server;

authenticating the client in the server;

creating a second end-to-end security link between the server and the trusted relay computer;

initiating transfer of information between the client and the server through the trusted relay computer; and during the transfer, processing, in the trusted relay computer, the information transferred between the client and the server.

8. The method according to claim 7, wherein the end-to-end security links are one of Secure Socket Layer links and Transport Layer Security links.

9. The method according to claim 7, wherein the processing includes reformatting information received at the trusted relay computer from one of the client and the server.

10. The method according to claim 7, wherein the processing includes testing a process of one of the client and server.

11. A method of connecting a plurality of clients to a server, comprising:

provide a plurality of trusted relays between the plurality of clients and the server;

providing each of the trusted relays with a certificate of the server and a private key of the server;

for each of the trusted relays, creating first end-to-end security links between a number of the plurality of clients and a respective trusted relay using the certificate and public key of the server; and creating second end-to-end security links between the server and each of the respective trusted relays.

12. The method according to claim 11, wherein the creating the second end-to-end security link includes a resumption handshaking session where a key pair from an initial handshaking session is used.

13. The method according to claim 12, wherein the server is capable of processing N initial handshaking sessions and N' resumption handshaking sessions, N' being greater than N, and wherein the step of providing the plurality of trusted relays includes providing N' trusted relays.

14. The method according to claim 11, wherein the end-to-end security links are one of Secure Socket Layer links and Transport Layer Security links.

15. A data processing system for providing a connection between a first computer and a second computer, comprising:

a third computer that receives information regarding one of the first and second computers to facilitate establishment of a secure connection between the first computer and the second computer;

a first end-to-end security link between the first computer and third computer; and a second end-to-end security link between the second computer and the third computer to establish the secure connection.

16. The data processing system according to claim 15, wherein the information regarding one of the first and second computers includes a certificate of the one of the computers and the first end-to-end security link is created using the certificate so as pass off the third computer as the one of the computers.

17. The data processing system according to claim 15, wherein the end-to-end security links are one of Secure Socket Layer links and Transport Layer Security links.

18. The data processing system according to claim 15, wherein the third computer processes information transmitted between the first and second computers in the third computer.

19. The data processing system according to claim 18, wherein the third computer reformats information received at the third computer from one of the first and second computers.

20. The data processing system according to claim 18, wherein the third computer is used in testing a process of one of the first and second computers.

21. A system including a client that receives a request from a user for a connection between the client and a server, which authenticates the client based on an authentication token, the system comprising:

a trusted relay including a storage device that stores the authentication token of the client and a device that processes information transmitted between the client and the server;

a first end-to-end security link between the client and the relay; and a second end-to-end security link between the server and the relay.

22. The system according to claim 21, wherein the end-to-end security links are one of Secure Socket Layer links and Transport Layer Security links.

23. The system according to claim 21, wherein the relay reformats information received at the relay from one of the client and server.

24. The system according to claim 21, wherein the relay is used in testing a process of one of the client and server.

25. A system of connecting a plurality of clients to a server, comprising:

a plurality of trusted relays between the plurality of clients and the server, each including a storage device that stores a certificate of the server and a private key of the server;

first end-to-end security links between each of the plurality of clients and any one of the relays, the first end-to-end security links created using the certificate and public key of the server; and second end-to-end security links between the server and each of the relays.

26. A computer-readable medium containing instructions for controlling a computer network to perform a method for providing a connection between a first computer and a second computer, the method comprising:

receiving, at a third computer, information regarding one of the first and second computers to facilitate establishment of a secure connection between the first computer and the second computer;

creating a first end-to-end security link between the first computer and third computer; and creating a second end-to-end security link between the second computer and the third computer to establish the secure connection.

* * * * *